United States Patent Office 2,724,292
Patented Nov. 22, 1955

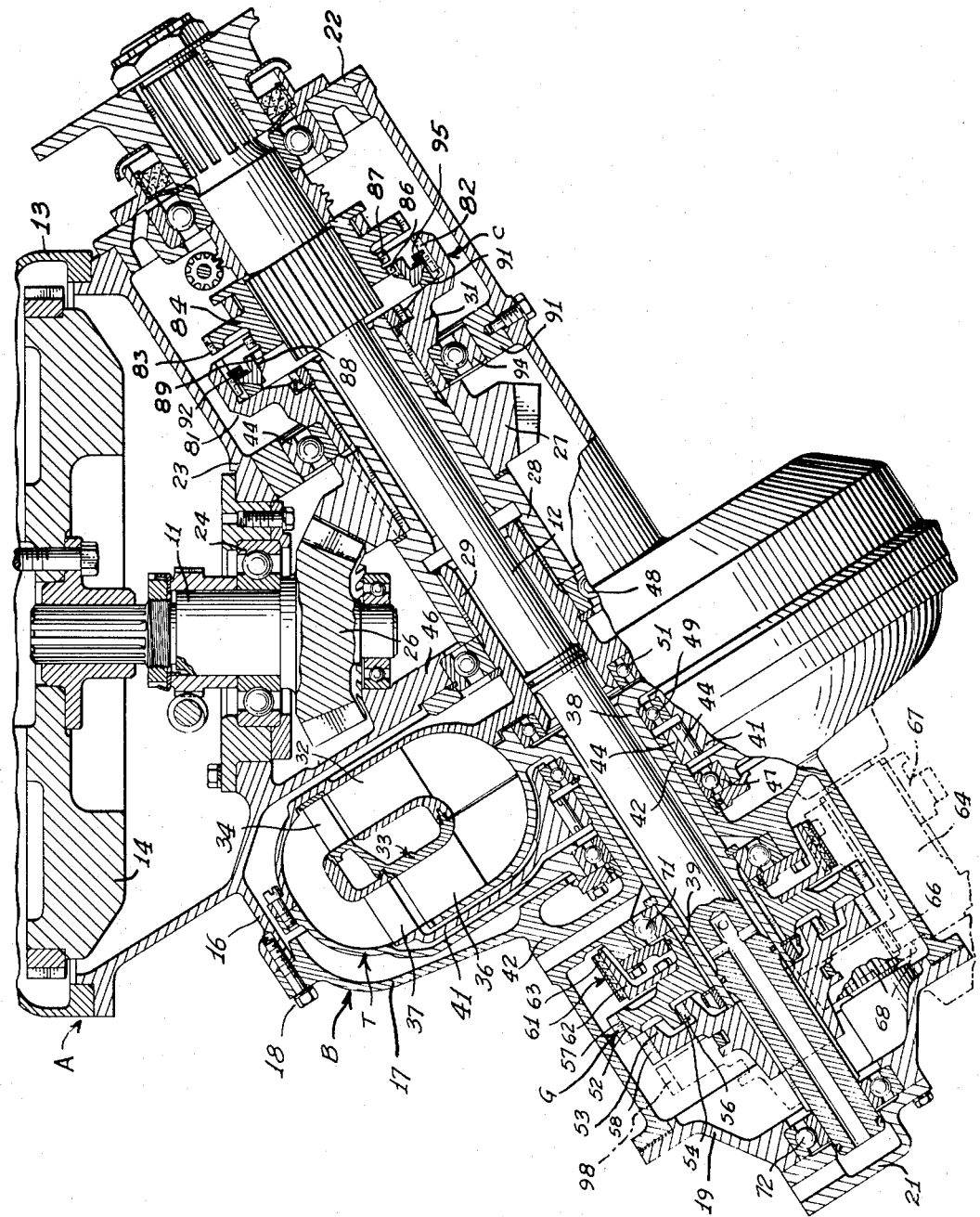

2,724,292

HYDRAULIC TORQUE CONVERTER

Helmuth Guentsche and Laurence A. Nelson, Pontiac, and Hans O. Schjolin, Birmingham, Mich., assignors to General Motors Corporation, Detroit, Mich., a corporation of Delaware Original application October 8, 1947, Serial No. 778,612, now Patent No. 2,694,950, dated November 23, 1954. Divided and this application February 15, 1954, Serial No. 415,857

13 Claims. (Cl. 74—732)

The present invention relates to an improved type angle-drive transmission and which transmission broadly includes means for providing drive from an engine to an output shaft either directly or through a fluid torque converter.

The invention is directed to an improvement in the structural relationships and organization of the components which make the aforementioned drive alternatives possible. More specifically, the present invention proposes a unique arrangement of transmission components with respect to the engine output shaft.

The present invention was divided from Patent 2,694,950 filed October 8, 1947, and is companion to applicants' copending application S. N. 415,858 Guentsche et al.

It is proposed in the present invention to provide an angle-drive transmission which includes a fluid torque converter and a change speed gear unit disposed on one side of the engine centerline and a direct drive clutch mechanism disposed on the opposite side of said centerline with respect to said torque converter and gear unit.

The present invention provides a compact angle-drive transmission of simple construction which may be easily assembled and serviced. The advantages of the instant invention will be more readily perceived from a perusal of the detailed description which follows.

The drawing represents a sectional plan view of the preferred embodiment of the subject invention.

Referring to the drawing, the engine or power input section of the power transmission device is shown generally at A and includes an engine driven shaft 11. A transmission mechanism angularly disposed to the centerline of the engine shaft 11 is shown generally at B and includes a power output shaft 12.

The transmission mechanism B includes a torque converter T and a change speed gearing unit G disposed on one side of the centerline and a direct drive clutch C disposed on the opposite side of the centerline.

The power mechanism is housed in a fabricated type casing which includes a casing 13 surrounding an engine flywheel 14. A main casing member 16 encloses most of the transmission B and is secured to flywheel casing 13. Another casing member 17 is attached to casing member 16 through studs 18 to provide the remaining portion of the torque converter casing as well as the main portion of the casing for the change speed gear unit G. The end of the change speed gearing unit is enclosed by a member 19 which includes a cover portion 21. The other end of casing member 16 is closed by a bearing and seal supporting member 22.

The various components of the power transmission mechanism will hereinafter be considered in detail in the order in which they are normally encountered in transmitting power through the power transmission mechanism.

The engine output shaft 11 is supported within a web member 23 of casing 16 and is rotatively mounted therewithin through a bearing member 24. A bevel gear 26 is mounted on one end of the engine shaft 11 and is adapted to coact with a similar bevel gear 27 suitably splined to an intermediate shaft member 28. Intermediate shaft 28 is coaxially disposed with respect to the transmission output shaft 12.

This left end of intermediate shaft 28 is internally splined to another coaxial shaft 29 while the right end is externally splined to coaxial shaft 31.

Referring now to the torque converter T, it includes an impeller member 32, a split turbine member 33 having a first stage of turbine blades 34 and a second stage of turbine blades 36, and a reaction member 37 interposed between the first and second turbine stages. The coaxial shaft 29 is integrally connected with the impeller member 32 and accordingly drives the latter upon rotation of the engine shaft. The turbine member 33 has integrally formed therewith a coaxial shaft 38 extending to the left of the transmission and having a splined end 39 formed thereon. The reaction member 37 is mounted upon a web member 41 which is supported upon a coaxial sleeve portion 42 of internal casing web member 43. A one-way brake member 44 is interposed between the web 41 and the casing web sleeve member 42 to permit the reaction member 37 to be grounded against rotation to the casing 17 when the torque converter is in a torque multiplying stage and yet to free wheel with impeller and turbine as torque multiplication diminishes.

In order to facilitate the rotation of the torque converter impeller member, casing webs 43 and 46 have disposed therein suitable bearing members 47 and 48. Similarly, smaller load capacity bearings 49 and 51 are provided to facilitate respectively the rotation of the reaction member 37 and the turbine member 33.

The gear changing unit G includes an externally toothed gear element 52 internally splined to the left end of the turbine output shaft 38. During normal forward drive, which will first be considered, gear element 52 is adapted to engage a gear element 53 internally splined to the output shaft 12. The gears 52 and 53 are adapted to be slidably engaged by the respective internal-external tooth portions 54 and 56 respectively formed on the gears radially inwardly of the external teeth 57 and 58.

In order to facilitate the engagement of teeth 54 and 56, a brake device 61 is provided to stop the rotation of gear 52 while the engagement of gear 53 therewith is taking place. The brake device includes a drum member 62 suitably bolted to gear member 52 and a brake band 63 adapted to engage the drum when braking of gear 52 is desired.

The gear unit G also includes a reversing device to reverse the direction of rotation of output shaft 12. The reversing mechanism includes a countershaft member 64 having a gear element 66 formed on one end thereof and a slider gear 67 disposed on the other end thereof. A reverse idler gear 68 is mounted in the casing 17 and is in constant engagement with the fixed gear element 66 of countershaft 64. When it is desired to provide a reverse drive, output shaft gear element 53 is slidably moved to the left out of engagement with the turbine driven gear 52 and into external engagement with the reverse idler 68. At the same time gear 53 is slidably moved out of engagement with gear 52, the slidable countershaft gear 67 is moved into external engagement with turbine driven gear 52. In this way drive will proceed from gear 52 through countershaft gear 67 to the fixed countershaft gear 66, to the reverse idler 68 and hence to the output shaft gear 53 which reversely rotates output shaft 12.

It is apparent that the control mechanisms for slidably shifting gear elements 53 and 67 are suitably coordinated so that the shifting or sliding movements of the gears take place in the proper sequence.

Suitable bearing members 71 and 72 are provided in casing web 43 and casing 19 to rotatably support the turbine output shaft 38 and the left end of the transmission output shaft 12.

Referring now to the direct drive lock-up clutch C disposed on the opposite side of the engine centerline from the torque converter and gear changing unit, it will be seen that the coaxial shaft 31 is integrally formed with input member 81 of the clutch. The clutch mechanism C is of the jaw clutch type in which internal teeth 82 formed on the input member 81 are adapted to engage teeth 83 formed externally on a sliding gear member 84. Member 84 is internally splined to the output shaft 12. To insure the shockless engagement of clutch member 81 with the sliding gear member 84, a synchronizing mechanism has been provided. The slider gear 84 has toothed portions 86 and 87, the teeth 86 meshing with internal teeth 88 of a friction ring 89. The friction ring 89 has an inclined friction face which is adapted to coact with an adjacent friction face of a ring 91 carried by the clutch input member 81. A pre-loaded spring 92, retained by a lock ring 95, exerts a light axial force on the friction ring 89 for moving it into engagement with ring 91. The teeth 86 and 87 are spaced to provide a balking action under attempted meshing of the external teeth 93 of the slider gear with the teeth 82 of the input member 81 until the slider gear and the input member are at substantially synchronous speeds.

This general type of constant pre-load bulk ring is explained in full in Letters Patent No. 2,420,914 issued May 20, 1947 to H. O. Schjolin for improvements in "Converter Construction and Control."

Bearing members 94 and 96 are respectively provided in casing web 97 and supporting member 22 to provide rotative support for the intermediate shaft 28 and the output shaft 12.

Considering now the overall operation of the power transmission device, it will be seen that the engine output shaft 11 when rotating will always drive intermediate shaft 28, and consequently the impeller member 32 of the torque converter and the input member 81 of the direct drive clutch are always rotating. However, although the drive from the engine output shaft appears to split to the left and right from the bevel gear 27, the power output from the transmission is alternatively either from the engine power shaft through the torque converter and ultimately through the output shaft or from the engine output shaft directly to the output shaft through the direct drive clutch mechanism C. While drive could physically proceed through both power paths simultaneously, no useful purpose would be served thereby and accordingly such drive is not intended. The disadvantage of such simultaneous drive would be a loss in power transmitting efficiency due to the hydraulic power losses occasioned in the fluid torque converter.

A normal drive sequence will now be considered. Assuming the vehicle to be at rest and forward drive desired, the direct drive clutch C is disengaged while the gear unit elements 52 and 53 are connected. In this condition drive will proceed from the engine shaft 11 through bevel gears 26 and 27, intermediate shaft 28, hence through the torque converter and turbine output shaft 38 to gear elements 52 and 53 and thence to the output shaft 12. When the vehicle speed becomes great enough so as to no longer necessitate torque multiplication through converter T, the slider gear 84 of the direct drive clutch C is shifted into engagement with the clutch input member 81 while simultaneously moving the gear unit slider gear 53 far to the left out of engagement with either the turbine driven gear member 52 or the reverse idler 68 to a neutral position which permits the torque converter to spin idly under no load.

To obtain reverse drive the procedure already described above is followed, but briefly includes disconnecting the direct drive clutch C from the output shaft 12 while shifting the slider gear 53 to the intermediate position 98 shown in dotted lines in which case the countershaft gearing and reverse idler will reverse the direction of rotation of the output shaft 12.

The transition or shift from torque converter drive to direct drive may be either manually or automatically controlled. While in the present device it is contemplated that the control would be automatic, these controls do not form a part of the present invention and, therefore, are not particularly shown or described. The shift from forward to reverse drive, as is usual even in automatic transmissions, would be manually achieved.

We claim:

1. An engine shaft, a variable speed ratio transmission assembly adapted to drive a driven shaft coaxial with said assembly, a driving shaft for said assembly, an arrangement of said engine shaft and said assembly in which their intersecting centerlines lie in one plane at an oblique angle, drive-transmitting means consisting of a fluid torque converter and a step-ratio gearing unit including a reversing train embodied in said assembly and located together on one side of the intersection of said centerlines, means adapted to operatively connect said unit to said driven shaft, a transfer gear group coupling said engine shaft with said assembly driving shaft, an input member of said converter coupled to said driving shaft, a converter output member, means for coupling said output member to said gear unit to provide forward or reverse drive, a direct drive coupling jaw clutch operative to connect said driving shaft to said driven shaft, said coupling clutch embodying blocking means preventing its engagement except at synchronous speeds of said driving and driven shafts, and drive selecting controls for said jaw clutch and said output member coupling means operative to provide direct drive between said driving and driven shafts or to provide drive from said driving shaft to said driven shaft through said converter and said unit at selected forward and reverse ratio ranges.

2. The combination set forth in claim 1, in which the step ratio gear unit consists of a toothed gearbody fixed to said output member, a splined slider gear mounted on said driven shaft, a countershaft with gear train elements, a reverse idler gear adapted to mesh with said glider gear and constantly meshed with an element of said train, a second slider gear splined on said countershaft and adapted to mesh with the teeth of said gearbody, mating clutch jaw teeth on said driven shaft slider and said gearbody, and control mechanism for said sliders effective to establish reverse drive of said driven shaft by said output member through said gearbody teeth, said countershaft slider gear, said element, said idler gear and said first named slider gear and effective to release drive between said driven shaft and said member or to couple them thru the said jaw teeth.

3. The combination set forth in claim 1 in which said means for coupling said torque converter output member to said gear unit includes a brake drum mounted to rotate with the said converter output member, a brake for said drum and operating means for said brake effective to retard the rotation of the drum for predetermined selective motion of said control means.

4. The combination set forth in claim 1 in which said direct drive coupling jaw clutch includes a driving jaw element fixed to said driving shaft in a location on the other side of said intersection for coaction with the jaw clutch driven element rotating with said driven shaft, and of control mechanism for moving one of said jaw elements toward and away from the other for establishing direct drive or for releasing same for drive by said converter.

5. An engine shaft, a driven shaft, a variable speed ratio assembly adapted to drive the driven shaft, the respective center lines of said engine shaft and said assembly intersecting at an oblique angle, a driving shaft for said assembly, means coupling said engine shaft with said driving shaft, said assembly consisting of a fluid torque converter and a drive changing gear unit located together on one side of the intersection of said center lines, means for coupling said gear unit to said driven shaft, an input member of said converter coupled to said driving shaft, a torque converter output member, means for coupling said output member to said gear unit, direct drive means for coupling said driving shaft to said driven shaft, and drive selecting controls for said direct drive means and said output member control means operative to selectively provide direct drive between said driving and driven shafts or to provide drive between said shafts indirectly through said torque converter and gear unit.

6. In the combination set forth in claim 5, said direct drive means including a device for preventing coupling of said driving and driven shafts until a synchronous speed therebetween is reached.

7. In the combination set forth in claim 5, said drive changing gear unit including brake means for restraining said torque converter output member against rotation in order to facilitate the coupling of said member to said gear unit.

8. In the combination as set forth in claim 5, said drive selecting controls being adapted to operatively disconnect said torque converter output member from said gear unit when said driven and driving shafts are directly connected.

9. An engine shaft, a driven shaft, a variable speed ratio transmission assembly adapted to drive the driven shaft, the respective centerlines of said engine shaft and said assembly intersecting at an oblique angle, said assembly consisting of a fluid torque converter and a drive changing gear unit located together on one side of the intersection of said centerlines, said converter including input and output members, means coupling said engine shaft with said input member, control means for coupling said output member to said gear unit, direct drive means for coupling said engine shaft to said driven shaft and drive-selecting controls for said direct drive means and said output member control means operative to provide direct drive between said engine and said driven shafts or to provide drive between said shafts indirectly through said converter and said gear unit.

10. An engine shaft, a driven shaft, a variable speed ratio transmission assembly adapted to drive the driven shaft, the respective centerlines of said engine shaft and said assembly intersecting at an oblique angle, said assembly consisting of a fluid torque converter and a drive changing gear unit located together on one side of the intersection of said centerlines, said converter including input and output members, means coupling said engine shaft with said input member, control means adapted to couple said output member to said gear unit, direct drive means for coupling said engine shaft to said driven shaft, said direct drive means being disposed on the opposite side of said centerline intersection from said converter and said gear unit, and drive-selecting controls for said direct drive means and said output member control means operative to provide drive between said engine and driven shafts either directly or indirectly or to provide drive by said converter and said gear unit.

11. An engine shaft, a driven shaft, a variable speed ratio transmission assembly adapted to drive the driven shaft, said assembly and driven shaft being coaxially related, the respective centerlines of said engine shaft and said assembly intersecting at an oblique angle, said assembly consisting of a fluid torque converter and a drive changing gear unit located together on one side of the intersection of said centerlines, said gear unit being adapted to transmit forward or reverse drive to said driven shaft, said converter including input and output members, means coupling said engine shaft with said input member, control means adapted to couple said output member to said gear unit, direct drive means for coupling said driving shaft to said driven shaft and drive-selecting controls for said direct drive means and said output member control means operative to provide direct drive between said driving and driven shafts or to provide drive between said shafts indirectly through said converter and said gear unit.

12. An engine shaft, a driven shaft, a variable speed ratio transmission assembly adapted to drive the driven shaft, the respective centerlines of said engine shaft and said assembly intersecting at an oblique angle, said assembly consisting of a fluid torque converter and a drive changing gear unit located together on one side of the intersection of said centerlines, said converter including input and output members, gear means coupling said engine shaft with said input member, first clutch means for coupling said output member to said gear unit, a direct drive clutch disposed on the opposite side of the centerline intersection from said converter and gear unit for coupling said engine shaft to said driven shaft, said torque converter being coaxially disposed intermediate said gear unit and said direct drive clutch, and drive-selecting controls for said direct drive means and said first clutch means operative to alternatively provide either direct drive between said driving and driven shafts or drive between said shafts indirectly through said converter and said gear unit.

13. An engine shaft, a driven shaft, variable speed ratio transmission assembly adapted to drive the driven shaft, the respective center lines of said engine shaft and said assembly intersecting at an oblique angle, said assembly consisting of a fluid torque converter and a drive changing gear unit coaxially disposed on one side of the intersection of said center lines, said converter including input and output members, means coupling said engine shaft with said input member so that said shaft and member rotate together at engine speed, a first clutch means for coupling said output member to said gear unit, said drive changing gear unit including means for restraining said torque converter output member against rotation in order to facilitate the coupling of said member to said gear unit, a direct drive clutch coaxially disposed on the opposite side of the center line intersection from said converter and gear unit for directly coupling said engine shaft to said driven shaft, and direct drive means including a device for preventing coupling of said driving and driven shafts until a synchronous speed therebetween is reached, said torque converter being disposed intermediate said gear unit and said torque drive clutch, and drive-selecting controls for said torque drive means and said first clutch means operative to alternatively provide either direct drive between said driving and driven shafts or drive between said shafts indirectly through said converter and said gear unit.

References Cited in the file of this patent

UNITED STATES PATENTS

| | | |
|---|---|---|
| 2,250,656 | Schjolin | July 29, 1941 |
| 2,325,876 | Pollard | Aug. 3, 1943 |
| 2,376,699 | Jandasek | May 22, 1945 |
| 2,435,930 | Schjolin | Feb. 10, 1948 |
| 2,459,093 | Peterson et al. | Jan. 11, 1949 |